(12) United States Patent
Kurihara et al.

(10) Patent No.: US 12,724,001 B2
(45) Date of Patent: Sep. 1, 2026

(54) ELECTROCHEMICAL SENSOR AND METHOD FOR MANUFACTURING ELECTROCHEMICAL SENSOR

(71) Applicant: SUMITOMO CHEMICAL COMPANY, LIMITED, Tokyo (JP)

(72) Inventors: Kaori Kurihara, Hitachi (JP); Yohei Otoki, Hitachi (JP); Koji Nakamura, Hitachi (JP); Yuichi Koibuchi, Hitachi (JP); Atsushi Sato, Hitachi (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 274 days.

(21) Appl. No.: 17/920,566

(22) PCT Filed: Apr. 15, 2021

(86) PCT No.: PCT/JP2021/015619

§ 371 (c)(1),
(2) Date: Oct. 21, 2022

(87) PCT Pub. No.: WO2021/215351

PCT Pub. Date: Oct. 28, 2021

(65) Prior Publication Data

US 2023/0152268 A1 May 18, 2023

(30) Foreign Application Priority Data

Apr. 23, 2020 (JP) ................................ 2020-076878

(51) Int. Cl.
*G01N 27/30* (2006.01)
*G01N 27/403* (2006.01)

(52) U.S. Cl.
CPC ......... *G01N 27/308* (2013.01); *G01N 27/403* (2013.01)

(58) Field of Classification Search
CPC .. G01N 27/308; G01N 27/403; G01N 27/327; G01N 33/493; G01N 27/4035
See application file for complete search history.

(56) References Cited

U.S. PATENT DOCUMENTS 6,423,193 B1 * 7/2002 Miller ................ C23C 14/0605 204/290.01
6,790,341 B1 * 9/2004 Saban .................. G01N 27/27 205/789

(Continued)

FOREIGN PATENT DOCUMENTS

EP 1055926 A2 * 11/2000 ............ G01N 27/26
JP H10227755 A * 8/1998

(Continued)

OTHER PUBLICATIONS

Choi et al., English translation of WO-2019004441-A1, 2019 (Year: 2019).*

(Continued)

*Primary Examiner* — Shizhi Qian
(74) *Attorney, Agent, or Firm* — Foley & Lardner LLP

(57) ABSTRACT

There is provided an electrochemical sensor, comprising: a working electrode; a counter electrode; and a base material supporting the working electrode and the counter electrode, wherein the working electrode is a chip-shaped electrode including a diamond film that causes a redox reaction on its surface when a predetermined voltage is applied in a state where a test sample exists between the working electrode and the counter electrode, and a support that comprises a material other than diamond and supports the diamond film, and the working electrode is mounted on the base material, with the support positioned on the base material side and at least a part of a side surface of the support exposed.

14 Claims, 6 Drawing Sheets

(56) References Cited

U.S. PATENT DOCUMENTS

| | | | | |
|---|---|---|---|---|
| 2004/0154934 | A1* | 8/2004 | Gobet | G01N 27/4168 205/787.5 |
| 2009/0104641 | A1* | 4/2009 | Su | G01N 33/726 436/66 |
| 2010/0090255 | A1* | 4/2010 | Fix | G01N 27/4141 257/253 |
| 2010/0294672 | A1* | 11/2010 | Gahr | G01N 27/42 205/786 |
| 2011/0162962 | A1* | 7/2011 | Mazellier | G01N 27/4148 438/1 |
| 2014/0001041 | A1* | 1/2014 | Rahman | C12M 41/36 204/403.01 |
| 2020/0116713 | A1* | 4/2020 | Sakamoto | G01N 33/54326 |
| 2022/0260516 | A1 | 8/2022 | Kurihara et al. | |

FOREIGN PATENT DOCUMENTS

| | | | | | |
|---|---|---|---|---|---|
| JP | 2001-147211 | A | | 5/2001 | |
| JP | 2007-292717 | A | | 11/2007 | |
| JP | 2008215887 | A | * | 9/2008 | |
| JP | 5120453 | B2 | * | 1/2013 | G01N 27/308 |
| JP | 2013186049 | A | * | 9/2013 | |
| JP | 2013190212 | A | * | 9/2013 | |
| JP | 2013-208259 | A | | 10/2013 | |
| JP | 2014095110 | A | * | 5/2014 | |
| WO | WO-2019004441 | A1 | * | 1/2019 | B01L 3/50 |
| WO | WO-2019139009 | A1 | * | 7/2019 | C07C 245/20 |
| WO | WO-2021/015067 | A1 | | 1/2021 | |

OTHER PUBLICATIONS

Watanabe, English translation of JP-2013186049-A, 2013 (Year: 2013).*

Morimoto et al., "Low-Resistivity Phosphorus-Doped Polycrystalline Silicon Thin Films Formed by Catalytic Chemical Vapor Deposition and Successive Rapid Thermal Annealing," 2002, Japanese Journal of Applied Physics, vol. 41, p. 501-506 (Year: 2002).*

Takashi et al., English translation of WO-2019139009-A1, 2019 (Year: 2019).*

Kamijo et al., English translation of JP-5120453-B2, 2013 (Year: 2013).*

Narai et al., English translation of JP-2014095110-A, 2014 (Year: 2014).*

Kitahara et al., English translation of JP-2008215887-A, 2008 (Year: 2008).*

Elasser et al., "Silicon Carbide Benefits and Advantages for Power Electronics Circuits and Systems," 2002, Proceedings of the IEEE, vol. 90, pp. 969-986 (Year: 2002).*

Benoudjit et al., "Study of electropolymerized PEDOT:PSS transducers for application as electrochemical sensors in aqueous media," 2018, Sensing and Bio-Sensing Research, vol. 17, pp. 18-24 (Year: 2018).*

Tech Briefs, "Evaluating Electrically Insulating Epoxies," 2014, Tech Briefs, pp. 1-8 (Year: 2014).*

Yoshioka et al., JPH10227755A, English translation, 1998 (Year: 1998).*

Watanabe et al., JP2013190212A, English translation, 2013 (Year: 2013).*

Striegler et al., Corrosion resistance of silicon-infiltrated silicon carbide, Ceramics International, 2018, 44, 10111-10118 (Year: 2018).*

International Preliminary Report on Patentability issued in connection with PCT/JP2021/015619 dated Oct. 25, 2022.

International Searching Authority, "Written Opinion," issued in connection with International Patent Application No. PCT/JP2021/015619, dated Jun. 8, 2021 (English Translation).

International Searching Authority, "International Search Report," issued in connection with International Patent Application No. PCT/JP2021/015619, dated Jun. 8, 2021.

International Searching Authority, "Written Opinion," issued in connection with International Patent Application No. PCT/JP2021/015619, dated Jun. 8, 2021.

European Extended Search Report issued in corresponding European Patent Application No. 21793503.0 dated Mar. 1, 2024 (9 pages).

Luong et al., "Boron-doped diamond electrode: synthesis, characterization, functionalization and analytical applications", The Royal Society of Chemistry, vol. 134, No. 10, Aug. 7, 2009, pp. 1965-1979.

Soh et al., "Diamond-derived ultramicroelectrodes designed for electrochemical analysis and bioanalyte sensing", ScienceDirect, Elsevier, vol. 17, No. 4-5, Jan. 9, 2008, pp. 900-905.

* cited by examiner

FIG. 1
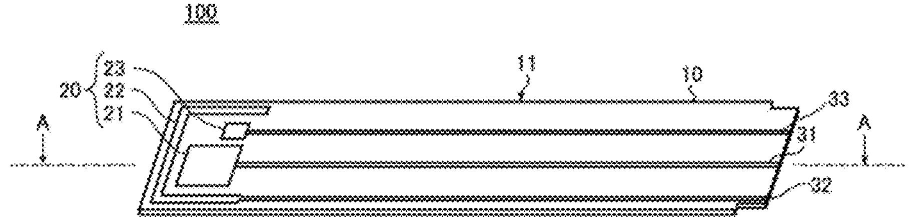
FIG. 2
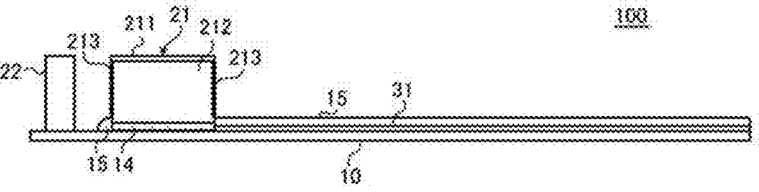
Fig. 3(a)
214
211
21
212
Fig. 3(b)
214
211
21
212

ELECTROCHEMICAL SENSOR AND METHOD FOR MANUFACTURING ELECTROCHEMICAL SENSOR

CROSS-REFERENCE TO RELATED APPLICATIONS

The present application claims priority under 37 U.S.C. § 371 to International Patent Application No. PCT/JP2021/015619, filed Apr. 15, 2021, which claims priority to and the benefit of Japanese Patent Application No. 2020-076878, filed on Apr. 23, 2020. The contents of these applications are hereby incorporated by reference in their entireties.

TECHNICAL FIELD

The present disclosure relates to an electrochemical sensor and a method for manufacturing an electrochemical sensor.

DESCRIPTION OF RELATED ART

Recently, it is proposed to use an electrode including a diamond film as a working electrode of an electrochemical sensor (see Patent Documents 1 and 2, for example). Since electrically conductive diamond has a wide potential window and small background current, it enables an electrochemical detection of various substances such as uric acid with a high sensitivity. Therefore, electrically conductive diamond is attracting attention as a material for forming the working electrode.

PRIOR ART DOCUMENT

Patent Document

Patent Document 1: Japanese Patent Laid-Open Publication No. 2007-292717

Patent Document 2: Japanese Patent Laid-Open Publication No. 2013-208259

SUMMARY

Problems to be Solved by the Disclosure

An object of the present disclosure is to provide an electrochemical sensor enable of an accurate sensing even with a simple structure, which includes a working electrode having a diamond film.

Means for Solving Problem

According to an aspect of the present disclosure, there is provided an electrochemical sensor and a related technique thereof, including:

- a working electrode;
- a counter electrode; and
- a base material supporting the working electrode and the counter electrode,
- wherein the working electrode is a chip-shaped electrode including a diamond film that causes a redox reaction on its surface when a predetermined voltage is applied in a state where a test sample exists between the working electrode and the counter electrode, and a support that comprises a material other than diamond and supports the diamond film, and the working electrode is mounted on the base material, with the support positioned on the base material and at least a part of a side surface of the support exposed.

Advantage of Disclosure

According to the present disclosure, there is provided an electrochemical sensor enable of an accurate sensing even with a simple structure, which includes a working electrode having a diamond film.

BRIEF DESCRIPTION OF DRAWINGS

FIG. 1 is a view illustrating an example of a perspective view of an electrochemical sensor according to an embodiment of the present disclosure.

FIG. 2 is a view illustrating a schematic configuration of the electrochemical sensor according to an embodiment of the present disclosure in a cross-sectional view taken along a line A-A in FIG. 1.

FIG. 3(*a*) is a view schematically illustrating a state where a diffusion layer is formed on a working electrode with a high aspect ratio, and FIG. 3(*b*) is a view schematically illustrating a state where a diffusion layer is formed on a working electrode with a low aspect ratio.

FIG. 5(*a*) is a view illustrating a cross-sectional structure of a stack including a diamond film and a substrate, FIG. 5(*b*) is a cross-sectional view illustrating a state where concave grooves are formed on a back surface of the stack illustrated in FIG. 5(*a*), and FIG. 5(*c*) is a schematic view illustrating how the diamond film is broken along the concave grooves to obtain the working electrode.

DETAILED DESCRIPTION

Figure 4:
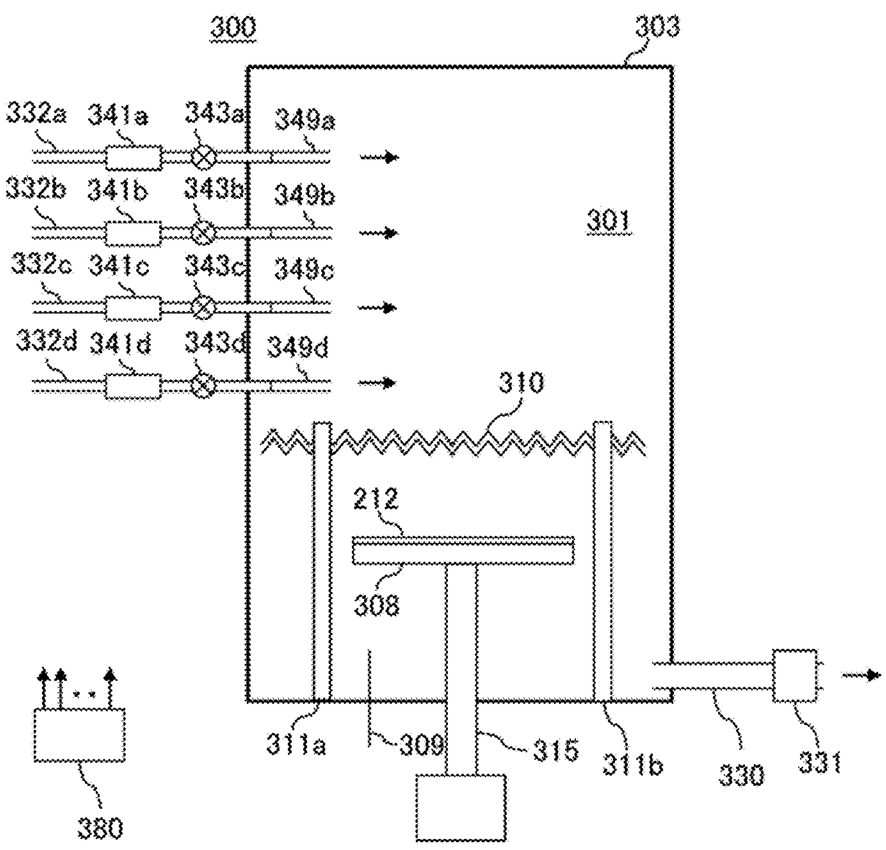
FIG. 4 is a schematic view of a vapor phase deposition apparatus used to grow a diamond film.

Findings obtained by the present inventors will be described before describing an embodiment of the present disclosure.

It is proposed to use a stack including a support comprising an electrically conductive material such as silicon (Si) and a diamond film, as a working electrode of an electrochemical sensor used for an electrochemical measurement. The "electrically conductive material" used herein refers to a material which is intervened between the diamond film and a working electrode circuit and allows electrical connection therebetween. Such an electrochemical sensor is configured as follows: a redox reaction (electrochemical reaction) of a predetermined component (e.g., uric acid) in a test sample (e.g., a liquid containing uric acid, such as urine) is caused on a surface of the diamond film by applying a predetermined voltage between the working electrode and a counter electrode in a state where the test sample is attached to the surface of the diamond film; and a concentration of the predetermined component in the test sample is measured by measuring a value of current flowing due to the redox reaction. In such an electrochemical sensor, the working electrode is commonly provided in such a manner that the test sample is not attached to a side surface of the support. For example, when the working electrode is provided, the side surface of the support is commonly covered with an insulating (waterproof) material in such a manner that the side surface of the support is not exposed. This is because, when the test sample is attached to the side surface of the support in a case where the redox reaction of the predetermined component in the test sample is caused on the surface of the diamond film, the redox reaction also is caused on the side surface of the support comprising the electrically conductive material. In such a case, since the measured current value includes a value of current due to the redox reaction caused on the surface of the diamond film and a value current due to the redox reaction caused on the side surface of the support, the concentration of the predetermined component in the test sample is not accurately measured in some cases. That is, a sensitivity of the electrochemical sensor decreases in some cases.

However, the present inventors found that even in a case of the electrochemical sensor in which the side surface of the silicon substrate as the support was exposed, the sensitivity of the sensor did not uniformly deteriorate, and a large variation in the sensitivity was generated within a range of voltage applied between the working electrode including the diamond film and the counter electrode (a voltage range of more than 0 volt (V) and 1 volt (V) or less, and preferably 0.5 V or more and 0.7 V or less) when measuring the concentration of uric acid in the test sample. Therefore, the present inventors investigated in detail the working electrodes of the electrochemical sensors in which the variation in the sensitivity is generated. As a result, the present inventors found that there were variations in degrees of the redox reaction caused on the side surfaces of the supports; in the working electrode with less deterioration in a sensor sensitivity, a large part of the side surface of the support was inactivated and the redox reaction was suppressed; and an insulating silicon oxide film was formed in the inactivated part. These findings were found for the first time as a result of intensive studies by the present inventors.

Based on the above results, it is found by the present inventors that in a case where the stack including the diamond film and the electrically conductive support is used as the working electrode, and the voltage applied between the working electrode and the counter electrode falls within the above voltage range, the redox reaction of uric acid or the like is not caused on the support even when the side surface of the support is not particularly covered with another insulating material, i.e., the support is exposed, so long as the entire side surface of the support is inactivated by covering with an insulation film such as an oxide film.

The present disclosure is based on the above findings found by the present inventors.

Embodiment of Present Disclosure

An electrochemical sensor of measuring a concentration of a predetermined component in a liquid test sample (electrolyte solution) by a three-electrode method, will be described hereinafter, as an embodiment of the present disclosure, with reference to FIGS. 1 to 5(*c*). In the present embodiment, explanation will be given for an example of the electrochemical sensor of measuring a concentration of uric acid in a liquid containing uric acid, such as urine, by the three-electrode method.

(1) Configuration of Electrochemical Sensor

As illustrated in FIG. 1, an electrochemical sensor 100 (hereinafter also referred to as a "sensor 100") according to the present embodiment includes: a base member 10; an electrode group 20 including a working electrode 21, a counter electrode 22, and a reference electrode 23, which are supported by the base member 10; and wirings 31 to 33 connected to the working electrode 21, the counter electrode 22, and the reference electrode 23, respectively.

The base member 10 is configured to support the working electrode 21, the counter electrode 22, and the reference electrode 23, i.e., to support the electrode group 20. The base member 10 is configured as a sheet-shaped (plate-shaped) member. The base member 10 can have, for example, a rectangular shape in a planar shape. The base member 10 has such a physical (mechanical) strength that it can be used as the sensor 100. For example, the base member 10 has such a strength that it does not bend or break even when a test sample is attached thereto. The base member 10 can comprise, for example, an insulating material such as an insulating composite resin, ceramics, glass, plastics, a combustible material, a biodegradable material, nonwoven fabric, or paper. The base member 10 is preferably a flexible base member. For example, a base member comprising glass epoxy resin or polyethylene terephthalate (PET) can be suitably used as the base member 10. As the substrate 10, a semiconductor base material or a metal base material can also be used which is configured in such a manner that its surface supporting the electrode group 20 has an insulating property.

The working electrode 21 is provided on one main surface of two main surfaces of the base member 10. The working electrode 21 is provided in the vicinity of one end of the base member 10 in a longitudinal direction. The working electrode 21 is configured as a stack including a diamond film 211 and a support 212 supporting the diamond film 211 (see FIG. 2). The working electrode 21 is placed on the base member 10 in such a manner that the support 212 is positioned on the base member 10 side. The sensor 100 provided with the working electrode 21 having the diamond film 211 is also referred to as a diamond sensor. Configurations of the working electrode 21 will be described in detail later.

Hereinafter, of the two main surfaces of the base member 10, the surface on which the working electrode 21 is provided, is also referred to as a "top surface of the base member 10".

The working electrode 21 is mounted (bonded) on the base member 10 via an electrically conductive adhesive agent (also referred to as a "conductive adhesive agent") 14. For example, a conductive paste such as a solder, a silver (Ag) paste or a copper (Cu) paste, an anisotropic conductive paste, or an anisotropic conductive film such as an ACF-film, can be used as the conductive adhesive agent 14. The conductive adhesive agent 14 is covered with an insulating (waterproof) material (hereinafter also referred to as an "insulation material 15") in such a manner that the conductive adhesive agent 14 is not exposed. The insulation material 15 is provided in such a manner that the conductive adhesive agent 14 is not exposed and at least a part of a side surface of the support 212 is exposed. That is, the working electrode 21 is mounted on the base material 10 with the support 212 positioned on the substrate 10 side, and at least a part of the side surface of the support 212 exposed without covering with the insulation material 15.

As described above, as a result of intensive studies by the present inventors, it is found that in a case where the surface (including the side surface) of the support 212 is inactivated, the redox reaction of uric acid or the like is not caused within a range of voltage applied when measuring the concentration of uric acid (the voltage range of more than 0 V and 1 V or less, and preferably 0.5 V or more and 0.7 V or less). Therefore, the concentration of uric acid can be accurately measured using the diamond sensor even when the working electrode 21 is provided on the base member 10, with at least a part of the side surface of the support 212 exposed.

Also, the counter electrode 22 and the reference electrode 23 are provided on the top surface of the base member 10. The counter electrode 22 and the reference electrode 23 are provided in the vicinity of the working electrode 21.

The counter electrode 22 is provided in such a manner that the counter electrode 22 surrounds the working electrode 21 and the reference electrode 23. An electrode comprising a metal such as platinum (Pt), gold (Au), copper (Cu), palladium (Pd), nickel (Ni), or silver (Ag), a carbon electrode, or the like, can be used as the counter electrode 22. The counter electrode 22 can be formed by a known method such as a semi-additive method or a subtractive method.

By applying the predetermined voltage between the working electrode 21 and the counter electrode 22 using, for example, a later-described measurement mechanism including a voltage applicator, in the state where the test sample is attached to (exists on) the working electrode 21 and the counter electrode 22, the redox reaction of the predetermined component (a predetermined reaction species, e.g., uric acid) in the test sample is caused on the working electrode 21 and the counter electrode 22, and consequently current flows between the working electrode 21 and the counter electrode 22. Hereinafter, "applying the predetermined voltage between the working electrode 21 and the counter electrode 22 using the measurement mechanism including the later-described voltage applicator, in the state where the test sample is attached" is also simply referred to as "applying the predetermined voltage".

The reference electrode 23 is an electrode used as a basis for determining a potential of the working electrode 21. For example, a silver/silver chloride (Ag/AgCl) electrode or the like can be used as the reference electrode 23. A standard hydrogen electrode, a reversible hydrogen electrode, a palladium-hydrogen electrode, a saturated calomel electrode, a carbon electrode, or the like can also be used as the reference electrode 23. An electrode comprising a metal such as Pt, Au, Cu, Pd, Ni, Ag, or the like can also be used as the reference electrode 23. The reference electrode 23 can be formed by, for example, a known method such as dispensing or screen printing.

One end of the wiring (conductive wiring) 31 is connected to the working electrode 21, one end of the wiring (conductive wiring) 32 is connected to the counter electrode 22, and one end of the wiring (conductive wiring) 33 is connected to the reference electrode 23. The wirings 31 to 33 are respectively provided on the top surface of the base member 10. That is, the wirings 31 to 33 are respectively supported on the base member 10.

The wiring 31 comprises an electrically conductive material, and is formed separately from the working electrode 21. The wiring 31 can comprise Cu, for example. The wiring 31 can comprise, in place of Cu, various noble metal such as Au, Pt, Ag, and Pd; various metal such as aluminum (Al), iron (Fe), Ni, chromium (Cr), or titanium (Ti); an alloy mainly comprising the above noble metal or metal; an oxide of the above noble metal or alloy; a metal oxide; or the like. The wiring 31 can also comprise carbon. The wiring 31 is electrically connected to the working electrode 21 via the conductive adhesive agent 14 (see FIG. 2). The conductive adhesive agent 14 and the wiring 31 are preferably covered with the above insulation material 15 (see FIG. 2).

The wiring 32 can comprise the same material as the material of the counter electrode 22, a material comprising the same material as the counter electrode 22, or a conductive material different from the material of the counter electrode 22. For example, the wiring 32 can comprise a material similar to the above-listed examples of the material of the wiring 31. The wiring 32 and the counter electrode 22 can be formed integrally or separately from each other. When the wiring 32 is formed separately from the counter electrode 22, the wiring 32 can be electrically connected to the counter electrode 22 using an adhesive agent similar to the conductive adhesive agent 14.

The wiring 33 can comprise the same material as the material of the reference electrode 23, a material comprising the same material as the reference electrode 23, or a conductive material different from the material of the reference electrode 23. For example, the wiring 33 can be formed using a material similar to the above-listed examples of the material of the wiring 31. The wiring 33 and the reference electrode 23 can be formed integrally or separately from each other. When the wiring 33 is formed separately from the reference electrode 23, the wiring 33 can be electrically connected to the reference electrode 23 using an adhesive agent similar to the conductive adhesive agent 14.

The wirings 31 to 33 can also be formed by Au-plating, Ag-plating, or the like on a conductive pattern formed by the subtractive method, the semi-additive method, or the like. The wirings 31 to 33 can also be formed by, instead of the subtractive method or the like, a printing method such as a screen printing, a gravure printing, an offset printing, or an inkjet printing, an evaporation method, or the like.

The wirings 31 to 33 may have the same configuration or configurations different from each other. For example, the wirings 31 to 33 may comprise the same material or materials different from each other.

(2) Configuration of Working Electrode

A configuration of the working electrode 21 according to the present embodiment will be described hereinafter, mainly with reference to FIGS. 2 and 3(*a*) and 3(*b*).

As illustrated in FIG. 2, the working electrode 21 is configured as the stack including the diamond film 211 that causes the redox reaction of the predetermined component (predetermined reaction species, e.g., uric acid) on its surface, when the predetermined voltage is applied in the state where the test sample (electrolyte solution) exists between the working electrode 21 and the counter electrode 22 using, for example, the later-described measurement mechanism including the voltage applicator, and the support 212 supporting the diamond film 211. As described above, the working electrode 21 is placed on the base member 10, with the support 212 positioned on the base member 10 side.

The diamond film 211 is a polycrystalline film. The diamond film 211 may also be a diamond like carbon (DLC) film. The "diamond film 211" used herein refers to the polycrystalline diamond film, the DLC-film, or both the polycrystalline diamond film and the DLC-film. The diamond film 211 is preferably p-type. In order to obtain the p-type diamond film 211, the diamond film 211 preferably comprises an element such as boron (B) at a concentration of, for example, $1\times10^{19}$ $cm^{-3}$ or more and $1\times10^{22}$ $cm^{-3}$ or less. The B-concentration in the diamond film 211 can be measured by, for example, a secondary ion mass spectrometry (SIMS). The diamond film 211 can be grown (synthesized) by a chemical vapor deposition (CVD) method such as a hot filament CVD method or a plasma CVD method, or a physical vapor deposition (PVD) method such as an ion beam method or an ionized deposition method. When the diamond film 211 is grown by the hot filament CVD method, a tungsten filament can be used as a filament, for example. The diamond film 211 can have a thickness of, for example, 0.5 μm or more and 10 μm or less, and preferably 2 μm or more and 4 μm or less.

The support 212 comprises a material other than diamond (different material). The support 212 preferably comprises a conductive material. The support 212 preferably comprises, for example, silicon (Si) alone or a silicon compound. That is, the support 212 is preferably a silicon Specifically, the support 212 is preferably a monocrystalline Si-substrate, a substrate, a polycrystalline Si-substrate, or a silicon carbide substrate (SiC-substrate).

The support 212 is preferably a substrate having a low specific resistance. The support 212 preferably comprises a material having a specific resistance of 0.04 Ωcm or less, i.e., the support 212 preferably has the specific resistance of 0.04 Ωcm or less.

This is because current (hereinafter also referred to as "reaction current") generated due to the above redox reaction of uric acid flows from a surface of the working electrode 21 (i.e., the diamond film 211) via the support 212 to the wiring 31. An external resistance on a path of the reaction current is preferably as low as possible.

Examples of components of the external resistance include (1) a resistance of an electrolyte solution between the working electrode 21 and the reference electrode 23, (2) a resistance of an interface between the working electrode 21 (diamond film 211) and a surface of the support 212, (3) a resistance of the support 212 itself, (4) a connection resistance (contact resistance) between a back surface of the support 212 and the conductive adhesive agent 14 (a metal component (metal filler) comprised in the conductive adhesive agent 14), (5) a connection resistance between the conductive adhesive agent 14 and the wiring 31, and (6) a wiring resistance. The resistance in (1) can be sufficiently low by setting a distance between the working electrode 21 and the reference electrode 23 to 5 mm or less. The resistances in (4) to (6) are usually low enough to be ignored. The resistances in (2) and (3) can be sufficiently low enough to be ignored by using a substrate having the low specific resistance as the support 212. Specifically, since the support 212 has the specific resistance of 0.04 Ωcm or less, the resistances in (2) and (3) can be sufficiently low. Thereby, the external resistance on the above path of the reaction current can be reduced, and a fluctuation of a value of the reaction current due to the external resistance can be reduced. Consequently, the concentration of uric acid in the test sample can be more accurately measured.

The external resistance, in particular, the above resistance in (4) is preferably, for example, 10% or less relative to a resistance (hereinafter also referred to as a "liquid-interface resistance") generated by a transfer of electron between a liquid and an interface, on the surface of the working electrode 21, due to the redox reaction of uric acid (an oxidation reaction of uric acid). Thereby, the fluctuation of the value of the reaction current due to the external resistance can be reliably reduced. Consequently, the concentration of uric acid in the test sample can be more accurately measured. When the above resistance in (4) is more than 10% relative to the liquid-interface resistance, an external resistance component is added to a profile of the reaction current (redox current) on a cyclic voltammogram obtained by, for example, a later-described cyclic voltammetry, and a value of peak current decreases in some cases. Therefore, the concentration of uric acid in the test sample can not be accurately measured in some cases.

Also from a viewpoint of making the resistance in (4) 10% or less relative to the liquid-interface resistance, the support 212 has preferably the specific resistance of, for example, 0.04 Ωcm or less.

Here, in a case of the working electrode 21 having the diamond film 211, the liquid-interface resistance fluctuates somewhat depending on measurement conditions and the like, but is usually about 120 $\Omega cm^2$. Accordingly, in the present embodiment, the resistance in (4) is preferably 12 $\Omega cm^2$ or less. When the working electrode 21 has a plane area of 4 $mm^2$ (when the working electrode 21 is a chip-shaped electrode having a square shape with 2 mm on each side), the liquid-interface resistance fluctuates somewhat depending on measurement conditions and the like, but is about 3 kΩ.

In order to make the resistance in (4) 12 $\Omega cm^2$ or less, a carrier concentration in the support 212 may be, for example, $1\times10^{18}$ $cm^{-3}$ or more. When the carrier concentration in the support 212 is, for example, $1\times10^{18}$ $cm^{-3}$ or more, the support 212 can have the specific resistance of, for example, 0.04 Ωcm or less, and consequently, the resistance in (4) can be 12 $\Omega cm^2$ or less as described above. The carrier concentration in the support 212 is preferably $1\times10^{19}$ $cm^{-3}$ or more. When the carrier concentration in the support 212 is $1\times10^{19}$ $cm^{-3}$ or more, the support 212 can have the specific resistance of 0.009 Ωcm or less, and consequently, the resistance in (4) can be further reduced. The carrier concentration in the support 212 is more preferably $5\times10^{19}$ $cm^{-3}$ or more.

When the carrier concentration in the support 212 is $5\times10^{19}$ $cm^{-3}$ or more, the support 212 can have the specific resistance of 0.003 Ωcm or less, and consequently, the resistance in (4) can be sufficiently reduced.

The present inventors have confirmed that when a silicon substrate having the specific resistance of, for example, 10 Ωcm (i.e., a silicon substrate having a high specific resistance) is used as the support 212, the resistance in (4) increases, and consequently, it is difficult to make the resistance in (4) 10% or less of the liquid-interface resistance, in some cases.

A lower limit value of the specific resistance of the support 212 can be, for example, 0.001 Ωcm. This is because the support 212 is preferably doped with boron (B) as an impurity for making the support 212 p-type, similarly to the diamond film 211. In order to make the specific resistance of the support 212 less than 0.001 Ωcm, it is necessary to dope the dopant (B) into the support 212 (silicon substrate) at a concentration of more than $1.5\times10^{20}$ $cm^{-3}$. In the support 212 comprising the dopant at such a high concentration, a production yield of crystals itself is likely to decrease. Moreover, there is sometimes a risk of deteriorating a performance of the support 212 by generating a crystal defect such as a precipitate of the dopant in the crystal. Therefore, the support 212 has desirably the specific resistance of 0.001 Ωcm or more.

Since the support 212 is doped with B, the support 212 can reliably have the low specific resistance. The support 212 preferably comprises B at a concentration of, for example, $5\times10^{18}$ cm$^{-3}$ or more and $1.5\times10^{20}$ cm$^{-3}$ or less, and more preferably at the concentration of $5\times10^{18}$ cm$^{-3}$ or more and $1.2\times10^{20}$ cm$^{3}$ or less. Since the B-concentration in the support 212 is $5\times10^{18}$ cm$^{-3}$ or more, the support 212 can reliably have the specific resistance of 0.04 Ωcm or less. Since the B-concentration in the support 212 is $1.5\times10^{20}$ cm$^{-3}$ or less, a reduction in the production yield of the support 212 and the deterioration of its performance can be suppressed while obtaining the support 212 having the specific resistance of about 0.001 Ωcm. Since the B-concentration in the support 212 is $1.2\times10^{20}$ cm$^{-3}$ or less, the reduction in the production yield of the support 212 and the deterioration of its performance can be reliably suppressed while obtaining the support 212 having the specific resistance of about 0.001 Ωcm.

The side surface of the support 212 is preferably configured in such a manner that an electrolysis of uric acid (redox reaction of uric acid) is not caused on the side surface when the predetermined voltage is applied. For example, the side surface of the support 212 is preferably inactivated. Here, "the side surface of the support 212 is inactivated" refers to a state where the side surface of the support 212 is subjected to a treatment (inactivation treatment) of suppressing of the occurrence of the redox reaction of uric acid on the side surface of the support 212 when the predetermined voltage is applied. It is sufficient that at least an outermost layer of the side surface of the support 212 may be inactivated. The side surface of the support 212 is inactivated by forming an insulating film (an insulation film) 213 on the side surface of the support 212.

For example, the side surface of the support 212 can be inactivated by oxidizing or nitriding the side surface of the support 212. In this case, the insulation film 213 is, for example, a portion ($SiO_2$-portion) where the support 212 comprising Si is oxidized to form a silicon oxide, or a portion (SiN-portion) where the support 212 comprising Si is nitrided to form a silicon nitride or the like.

The insulation film 213 is a continuous film and covers the entire side surface of the support 212. Thereby, even when the working electrode 21 is provided on the base member 10, with at least a part of the side surface of the support 212 exposed, the occurrence of the redox reaction of uric acid on the side surface of the support 212 can be reliably suppressed when the predetermined voltage is applied.

A thickness of the insulation film 213 (e.g., a thickness of the outermost layer of the side surface of the support 212 which is oxidized or nitrided) can be, for example, 1 nm or more, and preferably 2 nm or more. When the insulation film 213 has the thickness of 1 nm or more, the insulation film 213 can be the continuous film and cover the entire side surface of the support 212 without being exposed. Consequently, an effect of suppressing the occurrence of the redox reaction of uric acid on the side surface of the support 212 when the predetermined voltage is applied, can be obtained. When the insulation film 213 has the thickness of 2 nm or more, the insulation film 213 can more reliably be the continuous film and the above effect of suppressing the occurrence of the redox reaction of uric acid can be reliably obtained. When the insulation film 213 is extremely thick, a conductive region in the support 212 decreases. Accordingly, the insulation film 213 preferably has the thickness capable of obtaining the above effect of suppressing the occurrence of the redox reaction of uric acid, which is as thin as possible.

The support 212 can have a thickness of, for example, 350 μm or more. Thereby, a sensing sensitivity in an electromechanical measurement (hereinafter also simply referred to as a "sensing sensitivity") can be increased.

This is because, when the plane area of the working electrode 21 is constant, the thicker the support 212 is, the higher the aspect ratio (=height/width) of the electrode 21 is, and the thinner the support 212 is, the lower the aspect ratio of the electrode 21 is. With the start of the voltage application to the working electrode 21, uric acid (a reaction species) diffuses, and a diffusion layer of uric acid (diffusion layer of the reaction species) 214 is formed on the working electrode 21 (diamond film 211). In this event, in the electrode with the high aspect ratio, since a diffusion of uric acid becomes a diffusion which can be regarded as a two-dimensional diffusion or a three-dimensional diffusion such as a cylindrical diffusion or a spherical diffusion, the diffusion layer 214 has a nearly spherical shape (see FIG. 3(*a*)). In the electrode with the low aspect ratio, since the diffusion of uric acid becomes a one-dimensional diffusion (linear diffusion), the diffusion layer 214 has a semioval shape (see FIG. 3(*b*)). Arrows illustrated in FIGS. 3(*a*) and 3(*b*) schematically illustrate the diffusion of uric acid generated by applying the predetermined voltage. As described above, in the electrode with the high aspect ratio, since the spherical diffusion (the two-dimensional diffusion or the three-dimensional diffusion) is predominant over the linear diffusion, a density of current (current per unit area of the working electrode 21) generated due to the redox reaction of uric acid on the surface of the electrode is higher than that of the electrode with the low aspect ratio. Also, in the electrode with the high aspect ratio, an influence of IR-drop is less than that of the electrode with the low aspect ratio. The "IR-drop" refers to a voltage drop generated by current flowing between the working electrode 21 and the counter electrode 22, due to a solution resistance between the working electrode 21 and the reference electrode 23. In the electrode with the high aspect ratio, a ratio of the solution resistance in a resistance of the whole system decreases by increasing a resistance between the electrode and a liquid interface. Consequently, the influence of IR-drop decreases. The higher the aspect ratio of the working electrode 21 is, the higher the above density of the current becomes, and the more the influence of IR-drop can be suppressed, and consequently, the sensing sensitivity increases.

Since the support 212 has a thickness of, for example, 350 μm or more, the working electrode 21 can be an electrode on which uric acid diffuses in such a manner that can be regarded as the spherical diffusion when the predetermined voltage is applied. That is, the working electrode 21 can be the electrode with the high aspect ratio. Consequently, the sensing sensitivity can be increased. From a viewpoint of obtaining the working electrode 21 with the high aspect ratio, the support 212 is preferably as thick as possible. Since silicon substrates which are currently commonly distributed in the market, have a thickness of about 775 μm in a case of 12-inch monocrystalline Si-substrate, a maximum thickness of the support 212 is about 775 μm.

The working electrode 21 has a rectangular shape, for example, a square shape, in a planar view. That is, the working electrode 21 is formed into a chip-shape. The working electrode 21 can have a plane area of, for example, 25 mm$^2$ or less. Thereby, the working electrode 21 with the high aspect ratio can be easily obtained. When the thickness of the support 212 is constant, the smaller the plane area of the working electrode 21 is, the higher the aspect ratio of the working electrode 21 is. Accordingly, from a viewpoint of obtaining the working electrode 21 with the high aspect ratio, the plane area of the working electrode 21 is preferably as small as possible. Moreover, the smaller the plane area of the working electrode 21 is, the more the resistance between the electrode and the liquid interface increases, and the more the ratio of the solution resistance in the resistance of the whole system can be reduced. Consequently, the influence of IR-drop can also be reliably reduced. However, from a viewpoint of producing the chip-shaped working electrode 21, the working electrode 21 preferably has the plane area of, for example, 1 $mm^2$ or more. The working electrode 21 having the plane area of 1 $mm^2$ or more can be easily produced with a high precision and stability by a method using described later breaking. Also, since the working electrode 21 has the plane area of 1 $mm^2$ or more, a reduction of a handling property of the working electrode 21 and a reduction of a mounting stability of the working electrode 21 can be suppressed.

(3) Method for Manufacturing Electrochemical Sensor

A method for manufacturing the sensor 100 according to the present embodiment will be described, with reference to mainly FIGS. 4 and 5(*a*)-5(*c*).

The method for manufacturing the sensor 100 according to the present embodiment includes:

producing the working electrode 21 (step A); and providing the working electrode 21 on the base member 10 (step B).

In step A, a chip-shaped electrode is produced as the working electrode 21, the chip-shaped electrode including the diamond film 211 that causes the redox reaction on its surface when the predetermined voltage is applied between the working electrode 21 and the counter electrode 22, and the support 212 comprising the material other than diamond and supporting the diamond film 211.

In step B, the working electrode 21 is placed on the base member 10, with the support 212 positioned on the base material 10 side, and the working electrode 21 is mounted on the base member 10, with at least a part of the side surface of the support 212 exposed.

Furthermore, inactivating the side surface of the support 212 (step C) is performed after step B. In step C, for example, the base member 10 provided with the working electrode 21 and the like is annealed in an oxygen (O)-containing atmosphere or a nitrogen (N)-containing atmosphere, or is irradiated with ultraviolet ray in the O-containing atmosphere, to inactivate the side surface of the support 212. Alternatively, in step C, the base member 10 provided with the working electrode 21 and the like may be left in clean air to inactivate the side surface of the support 212.

(Step A)

In this step, the working electrode 21 including the diamond film 211 and the support 212 is produced.

Specifically, the support 212 comprising the material other than diamond is firstly prepared. For example, an electrically conductive support is prepared which has a circular outline in a planar view and comprises silicon (Si). Preferably, a support (e.g., silicon substrate) 212 is prepared which has an electrically conductive property and a low resistance. Then, either one of two main surfaces of the support 212 is subjected to a seeding process, a scratching process, or the like. Hereinafter, of the two main surfaces of the support 212, the surface subjected to the seeding process, the scratching process, or the like, i.e., the surface on which the diamond film 211 is to be grown, is also referred to as a "top surface of the support 212". The seeding process refers to a process of attaching diamond grains onto the top surface of the support 212 by applying a solution (dispersion liquid) on the top surface of the support 212, or by immersing the support 212 in the dispersion liquid, the dispersion liquid being a liquid in which the diamond grains (preferably diamond nanograins) of, for example, about several nanometers to several tens of micrometers disperse therein. The scratching process refers to a process of making scratches on the top surface of the support 212 using diamond abrasive grains (diamond powder) of about several micrometers, or the like. Thereby, the diamond film 211 can be grown on the top surface of the support 212.

After the support 212 is subjected to the seeding process, the scratching process, or the like, the diamond film 211 is grown on the top surface of the support 212 by the hot filament CVD method using the tungsten filament, for example.

The diamond film 211 can be grown, for example, using a hot filament CVD apparatus 300 illustrated in FIG. 4. The hot filament CVD apparatus 300 includes an airtight container 303 which comprises a heat-resistant material such as quartz and in which a growth chamber 301 is constructed. A susceptor 308 that holds the support 212 is provided inside the growth chamber 301. To a sidewall of the airtight container 303 are connected a gas supply pipe 332*a* that supplies nitrogen ($N_2$) gas into the growth chamber 301, a gas supply pipe 332*b* that supplies hydrogen ($H_2$) gas into the growth chamber 301, a gas supply pipe 332*c* that supplies methane ($CH_4$) gas or ethane ($C_2H_6$) gas as a carbon (C)-containing gas into the growth chamber 301, and a gas supply pipe 332*d* that supplies trimethyl boron ($B(CH_3)_3$, abbreviated as TMB) gas, trimethyl borate ($B(OCH_3)_3$) gas, triethyl borate ($B(C_2H_5O)_3$) gas, or diborane ($B_2H_6$) gas as a boron (B)-containing gas into the growth chamber 301. To the gas supply pipes 332*a* to 332*d* are respectively provided flow rate controllers 341*a* to 341*d* and valves 343*a* to 343*d* in order from an upstream side of a gas flow. To downstream ends of the gas supply pipes 332*a* to 332*d* are respectively connected nozzles 349*a* to 349*d* that supplies gas supplied through the gas supply pipes 332*a* to 332*d* into the growth chamber 301. To another side wall of the airtight container 303 is provided an exhaust pipe 330 that exhausts the inside of the growth chamber 301. A pump 331 is provided on the exhaust pipe 330. In the airtight container 303 is provided a temperature sensor 309 that measures a temperature inside the growth chamber 301. Also, in the airtight container are provided a tungsten filament 310, and a pair of electrodes (e.g., molybdenum (Mo) electrodes) 311*a* and 311*b* that heats the tungsten filament 310. Each member included in the hot filament CVD apparatus 300 is connected to a controller 380 configured as a computer, and is configured to control a later-described processing procedures and processing conditions with a program executed on the controller 380.

The diamond film 211 can be grown using the above hot filament CVD apparatus, for example, according to the following processing procedures. The support 212 is firstly loaded (installed) into the airtight container 303, and held on the susceptor 308. Then, $H_2$-gas is supplied into the growth chamber 301 while exhausting the growth chamber 301. Current is flowed between the electrodes 311*a* and 311*b* to start heating of the tungsten filament 310. As the tungsten filament 310 is heated, the support 212 held on the susceptor 308 is also heated. After the tungsten filament 310 reaches a desired temperature, and a pressure in the growth chamber 301 becomes a desired growth pressure, and an atmosphere in the growth chamber 301 becomes a desired atmosphere, the C-containing gas (e.g., $CH_4$-gas) and B-containing gas (e.g., TMB-gas) are supplied into the growth chamber 301. As $CH_4$-gas and TMB-gas supplied into the growth chamber 301 pass through the tungsten filament 310 heated to a high temperature, they are decomposed (thermally decomposed) to generate active species such as methyl radicals (CH3*). As these active species and the like are supplied on the support 212, the diamond film grows.

The following conditions are exemplified as the conditions for growing the diamond film 211. A growth time of the diamond film 211 is appropriately adjusted according to the thickness of the diamond film 211.

Figures 5A, 5B, 5C:
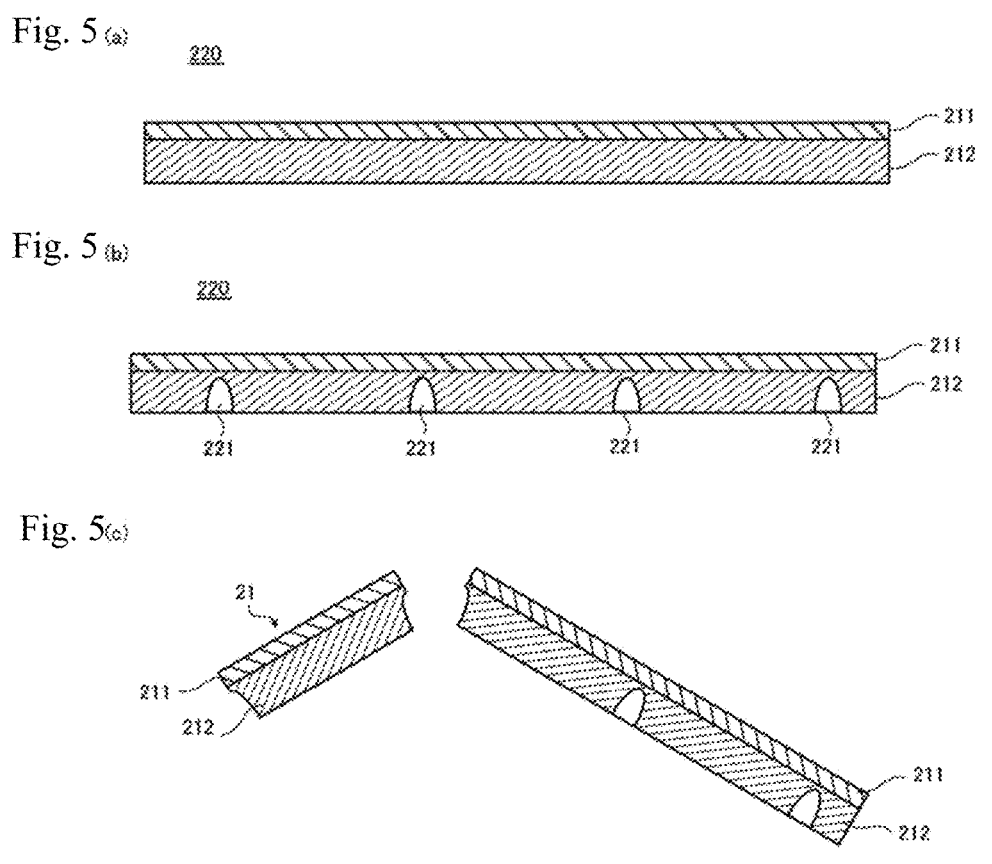

Substrate temperature: 600° C. or more and 1000° C. or less, and preferably 650° C. or more and 800° C. or less Filament temperature: 1800° C. or more and 2500° C. or less, and preferably 2000° C. or more and 2200° C. or less Pressure in growth chamber: 5 Torr or more and 50 Torr or less, and preferably 10 Torr or more and 35 Torr or less Percentage of partial pressure of TMB-gas relative to $CH_4$-gas ($TMB/CH_4$): 0.003% or more and 0.8% or less Percentage of $CH_4$-gas relative to $H_2$-gas ($CH_4/H_2$): 2% or more and 5% or less Thereby, there is produced a stack 220 including the support 212 and the diamond film 211 as illustrated in a schematic cross-sectional view in FIG. 5(*a*). Since the diamond film 211 is grown on the support 212 comprising the material other than diamond, the grown diamond film 211 is the polycrystalline diamond film or the DLC-film. Also, the B-concentration in the diamond film 211 grown under the above conditions is, for example, $1\times10^{19}$ $cm^{-3}$ or more and $1\times10^{22}$ $cm^{-3}$ or less.

After the growth of the diamond film 211 is completed, concave grooves 221 (e.g., scribed grooves) are formed from a back surface of the stack 220 (a surface opposite to the top surface of the support 212) as illustrated in FIG. 5(*b*). The concave grooves 221 can be formed by a known technique, for example, a laser processing such as a laser scribing or a laser dicing, a mechanical processing, or etching. The concave grooves 221 are preferably formed in such a manner that the concave grooves 221 do not penetrate the support 212 in a thickness direction, i.e., do not reach the diamond film 211. The concave grooves 221 are preferably formed in such a manner that the thinnest portion of the support 212 has a thickness of, for example, 10 μm or more and 80 μm or less. Since the concave grooves 221 are provided as described above, an alteration of the diamond film 211 can be suppressed while suppressing a reduction in a breaking controllability of the diamond film 211. By suppressing the alteration of the diamond film 211, the reduction in the sensing sensitivity can be suppressed. The "alteration of the diamond film 211" indicates that, for example, $sp^3$-bonds in the diamond film 211 are altered to $sp^2$-bonds, i.e., the diamond film 211 is graphitized.

Next, the diamond film 211 is broken along the concave grooves 221 as illustrated in FIG. 5(*c*). In this event, the diamond film 211 is preferably broken by being bent outward along the concave grooves 221. Thereby, there can be obtained the chip-shaped working electrode 21 including the diamond film 211 and the support 212.

It is also conceivable to form the concave grooves 221 from a front surface side (the diamond film 211 side) of the stack 220. However, since the diamond film 211 is very hard (has a high rigidity), it is difficult to form the concave grooves 221 from the diamond film 211 side by the laser processing, the mechanical processing, or the like.

It is also conceivable to shape the stack 220 into a predetermined form by dry etching or the like to obtain the working electrode 21. However, it is very difficult to shape the stack 220 including the diamond film 211 having the high rigidity into the predetermined shape by dry etching or the like. Moreover, an altered region is generated in the diamond film 211 by dry etching, in some cases.

Meanwhile, as described above, the concave grooves 221 are formed from the back surface side of the support 212 to break the diamond film 211 and the like along the concave grooves 221. Thereby, even when the working electrode 21 includes the diamond film 211 having the high rigidity, the predetermined-shaped (chip-shaped) working electrode 21 can be easily produced. Moreover, since etching or the like is not performed, the altered region is not generated in the diamond film 211, a reduction in a quality of the diamond film 211 can be suppressed, and a reduction in a sensor performance of the sensor 100 can be suppressed.

In the working electrode 21 obtained by the method for forming the concave grooves 221 and breaking the diamond film 211 along the concave grooves 221, at least either a scribed surface or an etched surface generated by forming the concave grooves 221, and a broken surface generated by breaking are formed on the side surface of the support 212, and a broken surface generated by breaking is formed on a side surface of the diamond film 211. The "scribed surface" used herein refers to a surface comprising a melted surface (a laser-processed surface) formed by the laser scribing (laser processing) or a cut surface (mechanically-processed surface) formed by a scribing (mechanical processing) using a diamond scriber or the like. The "etched surface" used herein refers to a surface formed by wet etching or etching using plasma or ion beams. Also, the "broken surface" used herein may comprise a cleaved surface.

(Step B)

After step A is finished, step B is performed.

In this step, the base member 10 is firstly prepared, and the wirings 31 to 33, for example, comprising Au are formed on the top surface of the base member 10. For example, the base member 10 on which a gold film (Au-film) is previously attached on any one of main surfaces of the base member is prepared, a predetermined resist pattern is formed on the Au-film, and thereafter, a part of the Au-film not covered with the resist (i.e., unnecessary part of the Au-film) is removed by etching or the like. Thus, a predetermined conductive pattern as the wirings 31 to 33 is formed on the base member 10. The wirings 31 to 33 may comprise, in place of Au, various noble metal such as Cu, Pt, Ag, and Pd; various metal such as Al, Fe, Ni, Cr, and Ti; the alloy mainly comprising the above noble metal or metal; the oxide of the above noble metal or alloy; the metal oxide; or the like. The counter electrode 22 integrated with the wiring 32 is also formed at the same time as the wirings 31 to 33.

Subsequently, the Ag/AgCl electrode is formed as the reference electrode 23. For example, a silver wiring or a silver plate is placed at a predetermined position on the wiring 33 comprising Au, and melted AgCl is applied to the silver wiring or the silver plate to form the Ag/AgCl electrode. It is also acceptable to provide the reference electrode 23 such as the Ag/AgCl electrode previously produced separately from the wiring 33 on the top surface of the base member 10 via a conductive adhesive agent similar to the conductive adhesive agent 14. In this case, a predetermined amount of the conductive adhesive agent is applied in such a manner that the reference electrode 23 and the wiring 33 are electrically connected via the conductive adhesive agent. An Au-exposed part of the wiring 33 may also be used as it is as the reference electrode 23 without forming the Ag/AgCl electrode.

Next, the working electrode 21 is provided (mounted) on the top surface of the base member 10 via the conductive adhesive agent 14, with the support 212 positioned on the base member 10 side. In this event, a predetermined amount of the conductive adhesive agent 14 is applied in such a manner that the working electrode 21 and the wiring 31 are electrically connected via the conductive adhesive agent 14. Then, the conductive adhesive agent 14 is solidified (a curing step).

Next, the wiring 31 and the conductive adhesive agent 14, which are exposed, are covered with the insulation material 15. The insulation material 15 is provided in such a manner that the wiring 31 and the conductive adhesive agent 14 are not exposed and at least a part of the side surface of the working electrode 21 (support 212) is exposed. In this event, the conductive adhesive agent electrically connecting the reference electrode 23 and the wiring 33, and the wirings 32 and 33 are also preferably covered with the insulation material 15 so as not to be exposed.

(Step C)

After step B is finished, step C is performed.

In this step, the base member 10 provided with the working electrode 21 and the like is annealed in the O-containing atmosphere or the N-containing atmosphere, with at least a part of the side surface of the support 212 exposed.

The following conditions are exemplified as the conditions for annealing.

- Annealing atmosphere: $O_2$-gas, air, or $N_2$-gas
- Annealing temperature: 60° C. or more and 200° C. or less, and preferably 70° C. or more and 140° C. or less
- Annealing time: 5 minutes or more and 180 minutes or less, and preferably 60 minutes or more and 120 minutes or less By performing annealing under the above conditions, a thermally oxidation film ($SiO_x$-film) or a nitride film (SiN-film) as the insulation film 213 can be formed over the entire side surface of the support 212, and at least the outermost layer of the side surface (i.e., the scribed surface or the etched surface, and the broken surface) of the support 212 can be inactivated.

In this step, instead of the above annealing, the base member 10 provided with the working electrode 21 and the like may also be irradiated with ultraviolet ray in the O-containing atmosphere using, for example, a mercury lamp, with at least a part of the side surface of the support 212 exposed.

The following conditions are exemplified as the conditions for irradiating the base material with ultraviolet ray.

- Irradiation atmosphere: $O_2$-gas or air
- Irradiation temperature: room temperature (25° C. to 28° C., e.g., 27° C.)
- Irradiation time: 5 minutes or more and 30 minutes or less, and preferably 10 minutes or more and 20 minutes or less By irradiating the base material with ultraviolet ray under the above conditions, an ozone oxidation film as the insulation film 213 can be formed over the entire side surface of the support 212, and the outermost layer of the side surface of the support 212 can be inactivated.

Alternatively, in this step, instead of the above annealing or ultraviolet ray irradiation, a natural oxidation film may also be formed by leaving the base member 10 provided with the working electrode 21 and the like in clean air such as in a clean bench, with at least a part of the side surface of the support 212 exposed.

The following conditions are exemplified as the conditions for forming the natural oxidation film.

- Atmosphere of forming natural oxidation film: air with a humidity of 50% or more
- Temperature of forming natural oxidation film: room temperature (25° C.) or more
- Time of forming natural oxidation film: 1000 minutes or more By leaving the base member 10 provided with the working electrode 21 and the like in air under the above conditions, the natural oxidation film as the insulation film 213 can be formed over the entire side surface of the support 212, and the side surface of the support 212 can be inactivated. However, for example, from a viewpoint that the insulation film 213 can be reliably the continuous film and the entire side surface of the support 212 can be reliably covered with the insulation film 213, the above annealing or the ultraviolet ray irradiation is more preferable.

By inactivating the side surface of the support 212 under the above conditions, the wirings 31 to 33 are oxidized or nitrided. However, only surfaces (outermost layers) of the wirings 31 to 33 are oxidized or nitrided under the annealing conditions, ultraviolet ray irradiation conditions, and natural oxidation film forming conditions in this step, and therefore, the conductivities of the wirings 31 to 33 are hardly affected.

Also, since this step (step C) is performed after step B is finished, specifically, after the working electrode 21 and the wiring 31 are electrically connected via the conductive adhesive agent 14, it is possible to reliably prevent the electrical connection between the working electrode 21 and the wiring 31 from cutting off due to an unintended portion being oxidized or the like by annealing or the like.

Even when step C is not intentionally performed, the natural oxidation film is formed on the side surface of the support 212. However, since such a natural oxidation film is a non-continuous film in many cases, the side surface of the support 212 is insufficiently inactivated when not performing step C. By performing step C, the entire side surface of the support 212 can be sufficiently inactivated and the entire side surface of the support 212 can be covered with the insulation film 213.

(4) Method for Measuring Uric Acid Concentration Using Electrochemical Sensor

A method for measuring the concentration of uric acid in urine by performing an electrochemical measurement using the above sensor 100, will be described.

The method for measuring the concentration of uric acid using the sensor 100 includes:

- connecting a measurement mechanism to the sensor 100 (step 1);
- supplying a test sample to the sensor 100 to supply (attach) the test sample to the electrode group 20 (step 2);
- applying a voltage between the working electrode 21 and the counter electrode 22 in a state where the test sample is in contact with the surface of the electrode group 20 to cause the redox reaction of uric acid on the surface of the diamond film 211 included in the working electrode 21, and measuring a value of current flowing due to the redox reaction of uric acid (step 3);
- measuring a potential difference (difference in voltage) between the working electrode 21 and the reference electrode 23 in the state where the test sample is in contact with the surface of the electrode group 20 (step 4); and determining the concentration of uric acid based on the measured current value and the measured potential difference (step 5).

(Step 1)

In this step, a measurement mechanism is connected to the sensor 100. Specifically, of ends of the wirings 31 to 33 included in the sensor 100, the ends opposite to the ends connected to the working electrode 21, the counter electrode 22, and the reference electrode 23 are respectively exposed, and a connector of the measurement mechanism is connected to the exposed ends. A known potentiostat or a similar electric circuit thereto can be used as the measurement mechanism. The measurement mechanism includes, for example, a voltage applicator, an amperemeter, a potentiometer, and a potential adjuster. The voltage applicator is configured to apply a voltage between the working electrode 21 and the counter electrode 22 when a predetermined circuit is formed by connecting the connector to the wirings 31 to 33. The amperemeter is configured to measure the current generated due to the redox reaction of uric acid. The potentiometer is configured to measure the potential difference between the working electrode 21 and the reference electrode 23. The potential adjuster is configured to keep a potential of the working electrode 21 constant with reference to a potential of the reference electrode 23, based on the potential difference measured by the potentiometer.

(Step 2)

After the measurement mechanism is connected to the sensor 100, a test sample is supplied to the sensor 100, and the test sample is attached to the electrode group 20.

(Step 3)

By applying the predetermined voltage between the working electrode 21 and the counter electrode 22 using the voltage applicator of the measurement mechanism in the state where the test sample is attached to the surface of the electrode group 20, the redox reaction of uric acid is caused on the surface of the diamond film 211 included in the working electrode 21. The occurrence of the redox reaction of uric acid causes current (reaction current) to flow through the working electrode 21. A value of the reaction current is measured by, for example, a cyclic voltammetry using the measurement mechanism. Exemplary cyclic voltammetry conditions are as follows: Voltage range, a range including 0 V or more and 1 V or less; and Sweep rate, 0.1 V/s or more and 1 V/s or less. The value of the reaction current may also be measured by a method such as a square wave voltammetry (rectangular-wave voltammetry), a differential pulse voltammetry, a normal pulse voltammetry, or an alternating current voltammetry.

(Step 4)

The potential difference between the working electrode 21 and the reference electrode 23 is measured using the potentiometer of the measurement mechanism in the state where the test sample is in contact with the surface of the electrode group 20.

(Step 5)

For example, a cyclic voltammogram is created from the values of the reaction current measured in step 3 to obtain a current value of an oxidation peak. The concentration of uric acid in the test sample is calculated (determined) based on the obtained the current value of the oxidation peak and the value of the potential difference measured in step 4. The present inventors have confirmed that the value of the reaction current is correlated with the concentration of uric acid in urine. Accordingly, by obtaining a relationship between the value of the reaction current and the concentration of uric acid in advance, the concentration of uric acid can be determined based on the measured value of the reaction current.

(5) Effects Obtained by the Present Embodiment

According to the present embodiment, one or more of the following effects can be obtained.

(a) In the present embodiment, the working electrode 21 is mounted on the base member 10, with at least a part of the side surface of the support 212 exposed. The sensor 100 can accurately measure the concentration of uric acid in a test sample even with a simple structure in which the working electrode 21 is mounted on the base member 10, with at least a part of the side surface of the support 212 exposed. That is, sensing can be accurately performed using the sensor 100 even with such a simple structure.

The present inventors have confirmed that the concentration of uric acid in a test sample containing uric acid can be accurately measured, even with at least a part of the side surface of the support 212 exposed. For example, the present inventors have confirmed that an oxidation current peak (oxidation peak) of uric acid can be clearly observed as illustrated in cyclic voltammograms of FIGS. 6(*a*) to 6(*c*). Also, the present inventors have confirmed that when the concentration of uric acid in a solution whose concentration of uric acid is known in advance (aqueous solution dissolved a predetermined amount of uric acid in water), is measured by the cyclic voltammetry using the sensor 100, the concentration of uric acid measured using the sensor 100 is matched the concentration of uric acid in the aqueous solution.

(b) Since the working electrode 21 is mounted on the base member 10, with the side surface of the support 212 exposed, the sensing sensitivity can be increased. The sensing sensitivity of the sensor 100 can be further increased by increasing an area of the exposed region of the side surface of the support 212.

Figure 6:
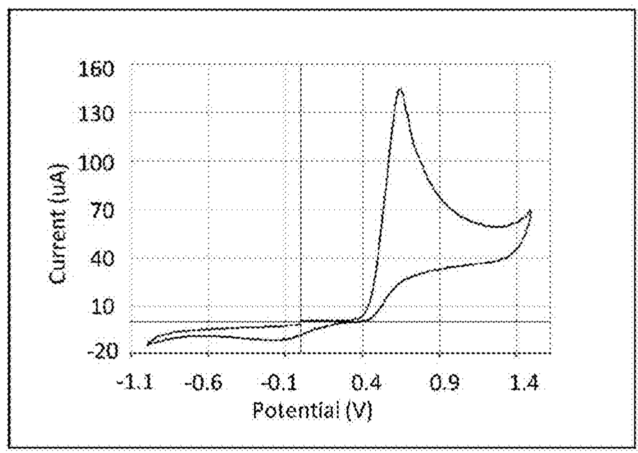
FIG. 6(*a*) is a cyclic voltammogram obtained by measuring a concentration of uric acid using sample 1, FIG. 6(*b*) is a cyclic voltammogram obtained by measuring a concentration of uric acid using sample 2, and FIG. 6(*c*) is a cyclic voltammogram obtained by measuring a concentration of uric acid using sample 3.
Figure 6B:
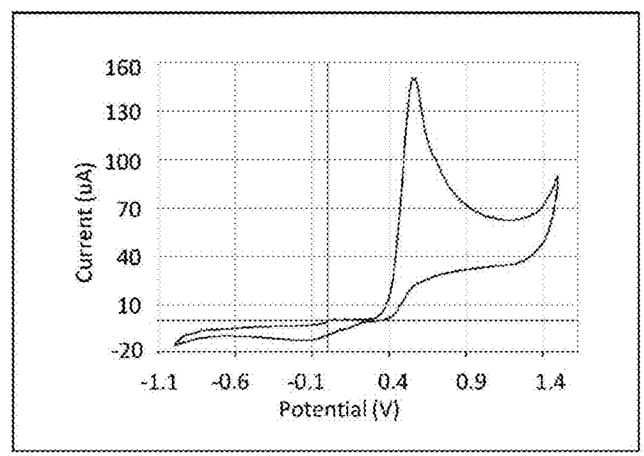
Figure 6:
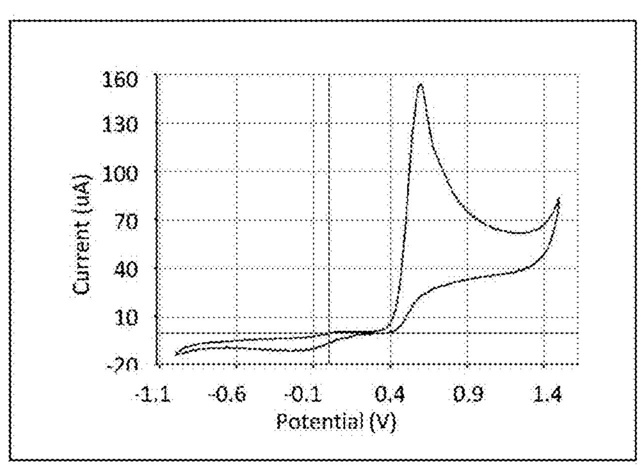
Figure 7A:
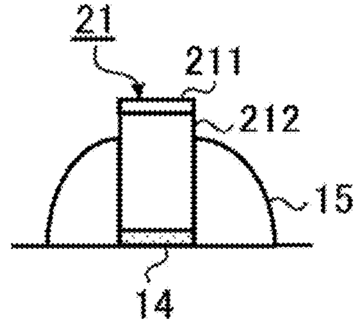
FIG. 7(*a*) is a view schematically illustrating the vicinity of a working electrode in sample 1, FIG. 7(*b*) is a view schematically illustrating the vicinity of a working electrode in sample 2, and FIG. 7(*c*) is a view schematically illustrating the vicinity of a working electrode in sample 3.
Figure 7B:
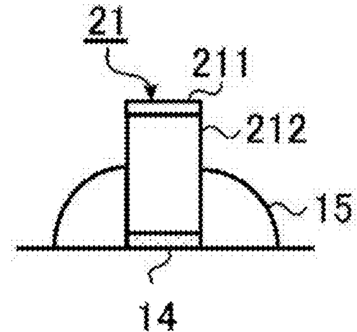
Figure 7C:
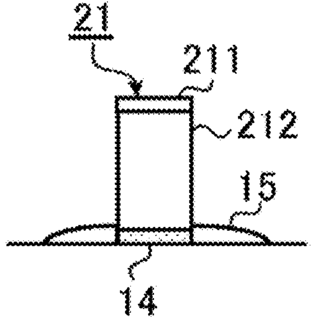

Here, sample 1 illustrated in FIG. 6(*a*), sample 2 illustrated in FIG. 6(*b*), and sample 3 illustrated in FIG. 6(*c*) have a different area of the exposed region of the side surface of the support 212, respectively. In sample 1, as illustrated in FIG. 7(*a*), a large region of the side surface of the support 212 is covered with the insulation material 15, i.e., the area of the exposed region of the side surface of the support 212 is small. In sample 2, as illustrated in FIG. 7(*b*), the area of the exposed region of the side surface of the support is larger than that in sample 1. In sample 3, as illustrated in FIG. 7(*c*), the area of the exposed region of the side surface of the support 212 is larger than those in samples 1 and 2. That is, the area of the exposed region of the side surface of the support 212 is largest in sample 3 and successively smaller in sample 2 and sample 1. When FIGS. 6(*a*) to 6(*c*) are compared, it can be found that the larger the area of the exposed region of the side surface of the support 212 is, the higher the current value of the oxidation peak observed around an applied voltage of 0.5 V in the cyclic voltammogram is. Thereby, it can be found that the larger the area of the exposed region of the side surface of the support 212 is, the higher the sensing sensitivity is.

When the working electrode 21 is not mounted, with the side surface of the support 212 exposed, i.e., when the entire side surface of the support 212 is covered with the insulation material 15, the sensing sensitivity decreases in some cases. This is because the diamond film 211 is very thin compared with the support 212, and accordingly, when the insulation material 15 is provided in such a manner as to cover the entire side surface of the support 212 and to prevent the entire side surface of the support 212 from being exposed, the insulation material 15 protrudes from the surface (top surface) of the diamond film 211 in many cases. Therefore, an area of the diamond film 211 contributing to sensing decreases, and consequently, the sensing sensitivity decreases in some cases. Moreover, when the entire side surface of the support 212 is covered with the insulation material 15, the effect of being the working electrode 21 with the high aspect ratio decreases in some cases. That is, the diffusion which can be regarded as the spherical diffusion may be less likely to cause. Also, it may be difficult to obtain the effect of suppressing the influence of IR-drop, in some cases. As a result of these, the sensing sensitivity decreases in some cases.

(c) By performing the treatment of inactivating the side surface of the support 212, the insulation film 213 can be reliably the continuous film and the entire side surface of the support 212 can be reliably covered with the insulation film 213. That is, the side surface of the support 212 can be sufficiently inactivated. Thereby, even when the test sample is attached to the side surface of the support 212, the occurrence of the redox reaction of uric acid on the side surface of the support 212 can be reliably suppressed when the predetermined voltage is applied. That is, it is possible to obtain the working electrode 21 configured such that the redox reaction is caused on the surface of the diamond film 211 but is not caused on the side surface of the support 212, when the predetermined voltage is applied. Thereby, the concentration of uric acid in the test sample can be more accurately measured.

Figure 8:
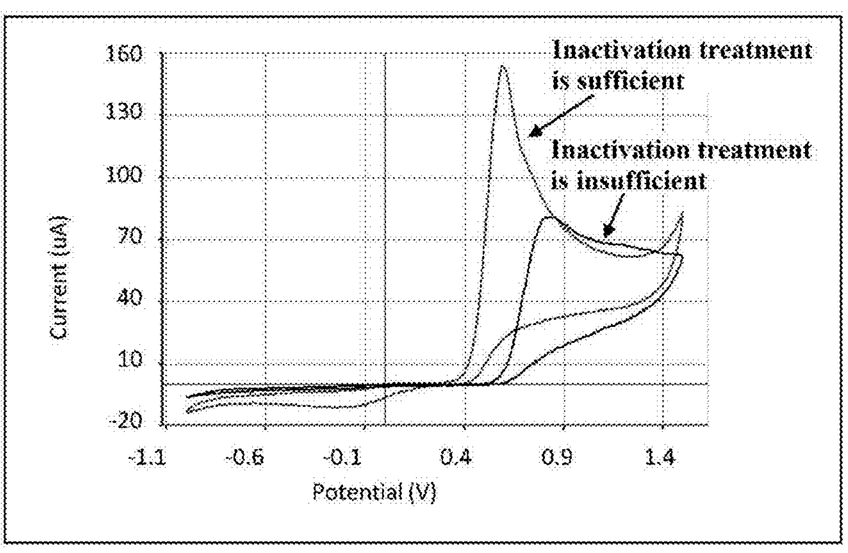
FIG. 8 illustrates cyclic voltammograms of a sample produced using a working electrode on which an inactivation treatment is sufficiently performed and a sample produced using a working electrode on which the inactivation treatment is insufficiently performed.

FIG. 8 illustrates cyclic voltammograms of a sample on which the inactivation treatment is sufficiently performed and a sample on which the inactivation treatment is insufficiently performed. As illustrated in FIG. 8, in a case where the inactivation treatment is insufficiently performed, the current value of the oxidation peak may be lower than that in a case where the inactivation treatment is sufficiently performed, and the oxidation peak may not appear clearly.

(d) Since the working electrode 21 has a chip-shape, the working electrode 21 can be easily placed on the base member 10. Therefore, a mass productivity of the sensor 100 produced using the working electrode 21 including the diamond film 211 having the high rigidity, can be improved.

(e) Since the support 212 has the specific resistance of 0.04 Ωcm or less, the external resistance on the path of the reaction current can be reduced, and the fluctuation of the value of the reaction current due to the external resistance can be suppressed. Consequently, the concentration of uric acid in the test sample can be more accurately measured.

(f) Since the support 212 has the specific resistance of 0.04 Ωcm or less, the support 212 can have the carrier concentration of, for example, $1\times10^{18}$ $cm^3$ or more. Thereby, the contact resistance between the back surface of the support 212 and the metal component in the conductive adhesive agent 14 can be 10% or less relative to the liquid-interface resistance. Accordingly, the fluctuation of the value of the reaction current due to the external resistance can be reliably suppressed. Moreover, it is possible to suppress a situation where the external resistance component is added to the profile of the reaction current on the cyclic voltammogram obtained by the cyclic voltammetry, and the peak current value decreases. As a result of these, the concentration of uric acid in the test sample can be more accurately measured.

(g) Since the support 212 has the thickness of 350 μm or more, the working electrode 21 can be the electrode on which uric acid diffuses in such a manner that can be regarded as the spherical diffusion when the predetermined voltage is applied. That is, the working electrode 21 can be the electrode with the high aspect ratio. Thereby, the density of the current generated due to the redox reaction of uric acid on the surface of the working electrode 21 can be increased, the influence of IR-drop can be reduced, and the sensing sensitivity can be increased.

(h) Since the support 212 has the thickness of 350 μm or more, commercially-available monocrystalline Si-substrate and polycrystalline Si-substrate having a size of 6 inches or 8 inches can be used as they are as the support 212 without a thickness of the substrate being adjusted by back lapping. Consequently, a productivity of the working electrode 21 can be increased and a production cost can be reduced.

(i) Since the working electrode 21 has the plane area of 25 $mm^2$ or less, the working electrode 21 with the high aspect ratio can be more easily obtained. Consequently, the sensing sensitivity can be reliably increased.

(j) Since the working electrode 21 is electrically connected to the wiring 31 via the conductive adhesive agent 14 without using a conventionally-performed wire bonding or the like, the working electrode 21 can be easily electrically connected to the wiring 31 even when the working electrode 21 has a small plane area. Also, the mass productivity of the sensor 100 can be improved when compared with a case of connecting the electrode 21 and the wiring 31 using the wire bonding or the like.

Here, a conventional working electrode having a diamond film will be described for reference. As the conventional working electrode having the diamond film, there is proposed a working electrode produced by preparing a substrate (circuit board) including an opening, and attaching a diamond film from a back surface side of the substrate in such a manner as to cover the opening, for example. In such a working electrode, it is necessary to use a diamond film having a larger plane area than a plane area of the opening. Since such a working electrode also requires an extra diamond film provided in a region which does not contribute to sensing, in addition to a region which contributes to the electrochemical measurement (sensing) (a region exposed from the opening), the production cost increases in some cases. Moreover, it is sometimes difficult to downsize the electrochemical sensor because the working electrode cannot be downsized. When such a working electrode is downsized, the substrate is too thick relative to an area of the opening, and accordingly, the diffusion of uric acid becomes the linear diffusion.

Also, there is proposed a needle electrode produced using diamond as a small working electrode having the diamond film. The needle electrode can be produced by evaporating the diamond film on a tip end of a metal needle. The needle electrode can also be produced by preparing a diamond base member, and forming a needle-shaped protrusion array structure on a surface of the diamond base member by dry etching or the like using oxygen gas. However, production processes of these working electrodes are complex when compared with a chip-shaped working electrode having the diamond film as in the present disclosure. Moreover, when dry etching is performed on the diamond base material, the dry-etched region and a surrounding region of the diamond base material are altered in some cases. In cases where a surface of the diamond base member is subjected to a laser irradiation, a plasma irradiation, an ion-beam irradiation, or the like as well, the diamond base member is altered in some cases, similarly to a case where the surface of the diamond base member is processed by dry etching. In the working electrode produced using the diamond base member having such an altered region, a precision of electrochemical measurement is decreased in some cases.

Other Embodiments

Explanations have been given specifically for the embodiment of the present disclosure. However, the present disclosure is not limited to the above embodiment, and can be variously modified in a range not departing from the gist of the present disclosure.

In the above embodiment, explanation has been given for a case where in step C, the side surface of the support 212 is inactivated by annealing, ultraviolet ray irradiation, or leaving in clean air, but the present disclosure is not limited thereto. That is, the inactivation treatment may be performed using various other methods so long as the side surface of the support 212 can be inactivated. For example, the side surface of the support 212 may be inactivated using various acids, a hydrogen peroxide solution, water, or the like, instead of the above annealing, the ultraviolet ray irradiation, or leaving in clean air. It is conceivable the following method as such a method: chemical etching is performed by immersing the base member in pure water comprising oxygen or a solution comprising an oxidizing agent; and the side surface of the support 212 is inactivated.

In the above embodiment and the other embodiment, explanation has been given for cases where in step C, the side surface of the support 212 is inactivated by performing annealing, the ultraviolet ray irradiation, and leaving in clean air, or chemical etching, but the present disclosure is not limited thereto. Of the above methods of inactivating the side surface of the support 212, two or more methods may be performed in combination as appropriate.

In the above embodiment, explanation has been given for a case where step C is performed after providing the working electrode 21, the counter electrode 22, the reference electrode 23, and the wirings 31 to 33 on the top surface of the base member 10, but the present disclosure is not limited thereto. Step C may also be performed before providing the counter electrode 22, the reference electrode 23, and the wirings 32 and 33 on the top surface of the base member 10 so long as being performed after the working electrode 21 and the wiring 31 are provided on the top surface of the base member 10 and electrically connected to each other via the conductive adhesive agent 14. In this case as well, the side surface (entire side surface) of the support 212 can be covered with the insulation film 213, and the side surface of the support 212 can be sufficiently inactivated. Consequently, the above effect of suppressing the redox reaction of uric acid can be obtained.

In the above embodiment, explanation has be given for a case where the conductive adhesive agent 14, the wiring 31, and the like are covered with the insulation material 15 without being exposed, but the present disclosure is not limited thereto. It is not necessary to cover the conductive adhesive agent 14, the wiring 31, and the like with the insulation material 15 so long as another method is taken so as to suppress exposures of the conductive adhesive agent 14, the wiring 31, and the like. That is, the insulation material 15 may not be provided in such a case.

In the above embodiment, explanation has been given for a case where the concentration of uric acid in urine as a liquid test sample containing uric acid is measured, but the present disclosure is not limited thereto. The liquid test sample may be, in place of urine of humans and animals, blood, tears, nasal mucus, saliva, sweat, or the like of humans and animals. Also, the detected component may be a component other than uric acid. So long as the range of voltage applied between the working electrode 21 and the counter electrode 22 is within the predetermined range, concentrations of various components (substances) in the liquid test sample can be measured by appropriately changing the conditions of the cyclic voltammetry.

A predetermined enzyme according to a detected component may be applied on the diamond film 211, the detected component such as uric acid and the enzyme may be electrochemically reacted, and the concentration of the detected component may be calculated.

In the above embodiment, explanation has been given for a case where the concentration of the predetermined component in the liquid test sample is measured by the three-electrode method, but the present disclosure is not limited thereto. For example, the concentration of the predetermined component in the liquid test sample may be measured by a two-electrode method. In this case, the sensor 100 may have structures similar to those in the above embodiment except that the reference electrode 23 and the wiring 33 are not provided.

In the above embodiment, explanation has been given for a case where the sensor 100 includes single electrode group 20, but the sensor 100 may include a plurality of the electrode groups 20. When a plurality of electrode groups 20 are included, the wirings 31 to 33 are connected to each of the electrodes.

Preferable Aspects of the Present Disclosure

Preferable aspects of the present disclosure will be supplementarily described hereinafter.

Supplementary Description 1

According to an aspect of the present disclosure, there is provided an electrochemical sensor including:

- a working electrode;
- a counter electrode; and
- a base material supporting the working electrode and the counter electrode,
- wherein the working electrode is a chip-shaped electrode including a diamond film that causes a redox reaction on its surface when a predetermined voltage is applied in a state where a test sample (electrolyte) exists between the working electrode and the counter electrode, and a support that comprises a material other than diamond and supports the diamond film, and
- the working electrode is mounted on the base material, with the support positioned on the base material side and at least a part of a side surface of the support exposed.

Supplementary Description 2

Preferably, there is provided the sensor according to supplementary description 1, wherein the working electrode is preferably configured in such a manner that the redox reaction is caused on the surface of the diamond film and is not caused on the side surface of the support when the predetermined voltage is applied in the state where the test sample exists between the working electrode and the counter electrode. That is, the side surface of the support is inactivated.

Supplementary Description 3

Preferably, there is provided the sensor according to supplementary description 1 or 2, wherein the support has an insulation film on its side surface. That is, the side surface of the support is inactivated by forming the insulation film on the side surface of the support.

Supplementary Description 4

Preferably, there is provided the sensor according to any one of supplementary descriptions 1 to 3, wherein a liquid containing uric acid as the test sample is supplied (attached) to the working electrode and the counter electrode to cause the redox reaction of uric acid in the liquid on the surface of the diamond film.

Supplementary Description 5

Preferably, there is provided the sensor according to any one of supplementary descriptions 1 to 4, wherein the support comprises a material having a specific resistance of 0.04 Ωcm or less.

Supplementary Description 6

Preferably, there is provided the sensor according to any one of supplementary descriptions 1 to 5, wherein the support comprises a silicon alone or a silicon compound.

Supplementary Description 7

Preferably, there is provided the sensor according to any one of supplementary descriptions 1 to 6, wherein the support is a monocrystalline silicon substrate, a polycrystalline silicon substrate, or a silicon carbide substrate.

Supplementary Description 8

Preferably, there is provided the sensor according to any one of supplementary descriptions 3 to 7, wherein the insulation film is a continuous film having a thickness of 1 nm or more, and covers the entire side surface of the support.

Supplementary Description 9

Preferably, there is provided the sensor according to any one of supplementary descriptions 1 to 8, wherein the support has a thickness of 350 μm or more.

Supplementary Description 10

Preferably, there is provided the sensor according to any one of supplementary descriptions 1 to 9, wherein the working electrode has a plane area of 25 $mm^2$ or less.

Supplementary Description 11

Preferably, there is provided the sensor according to any one of supplementary descriptions 1 to 10, wherein the working electrode is mounted (bonded) on the base material via an electrically conductive adhesive agent.

Supplementary Description 12

Preferably, there is provided the sensor according to any one of supplementary descriptions 1 to 11, further including a wiring connected to the working electrode, wherein the wiring is supported on the base material, and the working electrode and the wiring are electrically connected via an electrically conductive adhesive agent.

Supplementary Description 13

According to another aspect of the present disclosure, there is provided a method for manufacturing an electrochemical sensor, including:

producing a working electrode; and providing the working electrode on a base material, wherein in the producing of the working electrode, a chip-shaped electrode is produced as the working electrode, the chip-shaped electrode including a diamond film that causes a redox reaction when a predetermined voltage is applied in a state where a test sample (electrolyte solution) exists between the working electrode and a counter electrode provided on the bases material, and a support that comprises a material other than diamond and supports the diamond film, and in the providing of the working electrode on the base material, the working electrode is mounted on the base material, with the support positioned on the base material side and at least a part of a side surface of the support exposed.

Supplementary Description 14

Preferably, there is provided the method according to supplementary description 13, further including: inactivating the side surface of the support, after the providing of the working electrode on the base material.

Supplementary Description 15

Preferably, there is provided the method according to supplementary description 13, wherein in the inactivation of the side surface of the support, the base material provided with the working electrode is annealed in an oxygen-containing atmosphere or a nitrogen-containing atmosphere.

Supplementary Description 16

Preferably, there is provided the method according to supplementary description 13, wherein in the inactivation of the side surface of the support, the base material provided with the working electrode is irradiated with ultraviolet ray in an oxygen-containing atmosphere.

Supplementary Description 17

Preferably, there is provided the method according to supplementary description 13, wherein in the inactivation of the side surface of the support, the base material provided with the working electrode is left in air at a predetermined temperature for a predetermined period of time.

Supplementary Description 18

Preferably, there is provided the method according to any one of supplementary descriptions 13 to 17, wherein in the providing of the working electrode on the base material, the working electrode is mounted on the base material via an electrically conductive adhesive agent.

DESCRIPTION OF SIGNS AND NUMERALS

100 Electrochemical sensor
10 Base material

21 Working electrode
211 Diamond film
212 Support
22 Counter electrode

The invention claimed is:

1. An electrochemical sensor, comprising:
a working electrode;
a counter electrode;
a wiring connected to the working electrode; and
a base material supporting the working electrode, the counter electrode, and the wiring,
wherein the working electrode is a chip-shaped electrode comprising (i) a diamond film that causes a redox reaction on its surface when a predetermined voltage is applied in a state where a test sample exists between the working electrode and the counter electrode, and (ii) a support that comprises a conductive material composed of a silicon alone or a silicon compound and supports the diamond film on a first surface of the support,
the support has an insulation film consisting of silicon oxide or silicon nitride on an entire side surface of the support and does not have the insulation film on the first surface that supports the diamond film so that the diamond film is in direct contact with the first surface of the support,
the diamond film does not have the insulation film on an entire top surface and an entire side surface,
the working electrode and the wiring are electrically connected via a conductive adhesive agent,
the working electrode is mounted on the base material via the conductive adhesive agent, with the support positioned on the base material,
the conductive adhesive agent and the wiring are covered with an insulation material in such a manner that they are not exposed, and
at least a part of the insulation film on the side surface of the support of the working electrode is exposed without covering the insulation material.

2. The electrochemical sensor according to claim 1, wherein the working electrode is configured in such a manner that the redox reaction is caused on the surface of the diamond film and is not caused on the side surface of the support when the predetermined voltage is applied in the state where the test sample exists between the working electrode and the counter electrode.

3. The electrochemical sensor according to claim 2, wherein a liquid containing uric acid as the test sample is supplied to the working electrode and the counter electrode to cause the redox reaction of uric acid in the liquid on the surface of the diamond film.

4. The electrochemical sensor according to claim 2, wherein the support comprises an electrically conductive material having a specific resistance of 0.04 Ωcm or less.

5. The electrochemical sensor according to claim 1, wherein a liquid containing uric acid as the test sample is supplied to the working electrode and the counter electrode to cause the redox reaction of uric acid in the liquid on the surface of the diamond film.

6. The electrochemical sensor according to claim 5, wherein the support comprises an electrically conductive material having a specific resistance of 0.04 Ωcm or less.

7. The electrochemical sensor according to claim 1, wherein the support comprises an electrically conductive material having a specific resistance of 0.04 Ωcm or less.

8. The electrochemical sensor according to claim 1, wherein the support has a thickness of 350 μm or more.

9. The electrochemical sensor according to claim 1, wherein the working electrode has a plane area of 25 $mm^2$ or less.

10. A method for manufacturing the electrochemical sensor of claim 1, comprising:
producing the working electrode; and
providing the working electrode on the base material,
wherein in the producing of the working electrode, the chip-shaped electrode is produced as the working electrode, the chip-shaped electrode including the diamond film that causes the redox reaction on its surface when the predetermined voltage is applied in the state where the test sample exists between the working electrode and the counter electrode provided on the base material, and the support that comprises a material other than diamond and supports the diamond film, and
in the providing of the working electrode on the base material, the working electrode is mounted on the base material, with the support positioned on the base material and at least a part of the side surface of the support exposed.

11. The method for manufacturing the electrochemical sensor according to claim 10, further comprising:
inactivating the side surface of the support, after the providing of the working electrode on the base material.

12. The electrochemical sensor according to claim 1, wherein the insulation film has a thickness of 1 nm or more.

13. The electrochemical sensor according to claim 1, wherein the support consists of (i) the silicon or the silicon compound and (ii) the insulation film.

14. The electrochemical sensor according to claim 13, wherein the silicon compound is silicon carbide.

* * * * *